United States Patent [19]

Shiokawa et al.

[11] 4,400,703

[45] Aug. 23, 1983

[54] SPIRAL ARRAY ANTENNA

[75] Inventors: Takayasu Shiokawa; Yoshio Karasawa, both of Tokyo, Japan

[73] Assignee: Kokusai Denshin Denwa Kabushiki Kaisha, Tokyo, Japan

[21] Appl. No.: 269,452

[22] Filed: Jun. 2, 1981

[30] Foreign Application Priority Data

Jun. 24, 1980 [JP] Japan ................................ 55-84625

[51] Int. Cl.³ .............................................. H01G 1/36

[52] U.S. Cl. .................................................. 343/895

[58] Field of Search ........................ 343/844, 895, 841

[56] References Cited

U.S. PATENT DOCUMENTS 3,257,660 6/1966 Schneider .......................... 343/895

3,383,695 5/1968 Jarek .................................. 343/895

3,932,876 1/1976 Ben-Dou ............................ 343/895

*Primary Examiner*—Eli Lieberman

*Attorney, Agent, or Firm*—Pollock, Vande Sande & Priddy

[57] ABSTRACT

A compact and light weight array antenna with a gain of approximately 13 dB comprises a plurality of axial-mode helical antennas with an antenna height of 0.4∼0.6λ (λ: Wavelength) as element antennas, having cylindrical metallic rims with a rim height of approximately 0.25λ surrounding each corresponding element antenna in order to suppress the characteristic degradation of the device caused by the mutual coupling of element antennas.

3 Claims, 8 Drawing Figures

(a)

(b)

SPIRAL ARRAY ANTENNA

THE FIELD OF THE INVENTION

The present invention relates to a compact and light weight array antenna with a gain of approximately 13 dB applicable to a mobile communication antenna using circular polarized waves.

DESCRIPTION OF THE PRIOR ART

The maritime satellite communication has been noted recently as one of the mobile communication applications that can carry out communication between ships under way and land stations, and it has been put in commercial services as the MARISAT system, most of which use ship-borne antennas with a gain of 23 dB more or less to secure high quality telephone communication. However, the prior-art ship-borne antennas of this type have been developed specifically for large size passenger boats.

There have been proposed a number of simpler antenna systems which can be borne on smaller maritime vessels for future communication systems. The gain required for this type of ship-borne antenna may be lower than that required for the MARISAT system, e.g. the INMARSAT standard-B system requires a gain of only around 13 dB. For this reason, what is required primarily for this type of maritime antenna system is an antenna system as compact and light weight as possible with a gain of approximately 13 dB.

However, antenna gain lowering or system simplification is accomplished with the necessity of providing additional functions for reducing fading due to scattering from the sea. For example, realizing the function of reducing fading in many cases required the antenna system to be able to carry out the electrical control of directivity. However, it is difficult for antennas having a single feed system, such as parabolic antennas and short backfire antennas, to have such an additional function.

In contrast to the foregoing, an array antenna has the advantage of being able to change directivity easily by controlling the phase at the feeding point of each antenna. The array antenna is, therefore, suitable for a simple system such as the above.

However, when one tries to obtain a prior-art array antenna with the same characteristics as the aperture antenna, the array antenna often becomes larger in size than the aperture antenna. This makes it difficult to use the prior-art array antennas as ship-borne antennas when it is desired that the array be made compact.

SUMMARY OF THE INVENTION

It is an object of the invention provide an antenna for mobile communication fabricated by a compact, light weight, and high quality array antenna appropriate to the said simple system.

It is another object of the invention to provide a compact and light weight array antenna with a gain of approximately 13 dB comprising axial-mode helical antennas of 0.4 to 0.6λ height (λ: Wavelength) as element antennas and cylindrical metallic rims disposed coaxially around the said element antennas, respectively, in order to suppress the degradation of the characteristics of the antenna system caused by the mutual coupling of element antennas.

BRIEF DESCRIPTION OF THE DRAWINGS

FIG. 5 (*b*) is the side elevation of the embodiment shown in FIG. 5 (*a*);

DETAILED DESCRIPTION OF THE INVENTION

First, the characteristics of the axial-mode helical antenna with a height of 0.4 to 0.6λ (in case of a pitch angle of 14°, an antenna height of 0.5λ corresponds to a 2-turn helix) will be explained; such antennas are used as element antennas for the array antenna of the present invention.

The axial-mode helical antenna (with a helical circumferential length of approximately 1λ and a pitch angle of 12° to 14°), which can be driven by a finite size reflector, has been well known heretofore as an antenna having a good characteristic for wide-band circular polarized waves. The current distribution along the helix of the helical antenna consists of two traveling waves (one is a traveling wave of uniform amplitude and the other a traveling wave whose amplitude damps abruptly at a distance from the feed point) and two backward traveling waves (one is a uniform reflective wave and the other a reflective wave whose amplitude damps abruptly at a distance from the antenna end.)

Figure 1:
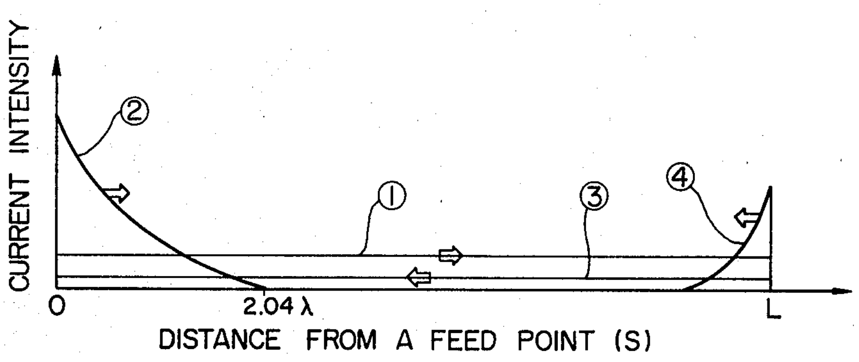
FIG. 1 is a diagram in which four resolved modes of the current induced on a helical antenna line are drawn, where the abscissa represents distance measured from the feed point along the helix and the ordinate represents current intensity.

FIG. 1 shows conceptually each mode of the current distribution, of which abscissa S stands for the distance from the feed point along the helix and the ordinate stands for the current intensity, where the feed point is at S=O and the antenna end is at S=L. In the figure, the current distributions for numerical symbols with circle ①, ②, ③, and ④ are, respectively, due to a uniform traveling wave, a traveling wave damping abruptly at a distance from the feed point, a uniform reflective wave, and a reflective wave damping abruptly at a distance from the antenna end. The radiation characteristic of the prior-art long-turn (more than 6 turns) axial-mode helical antennas, which have been used frequently, is determined principally by the current distribution ① of FIG. 1.

Figure 2:
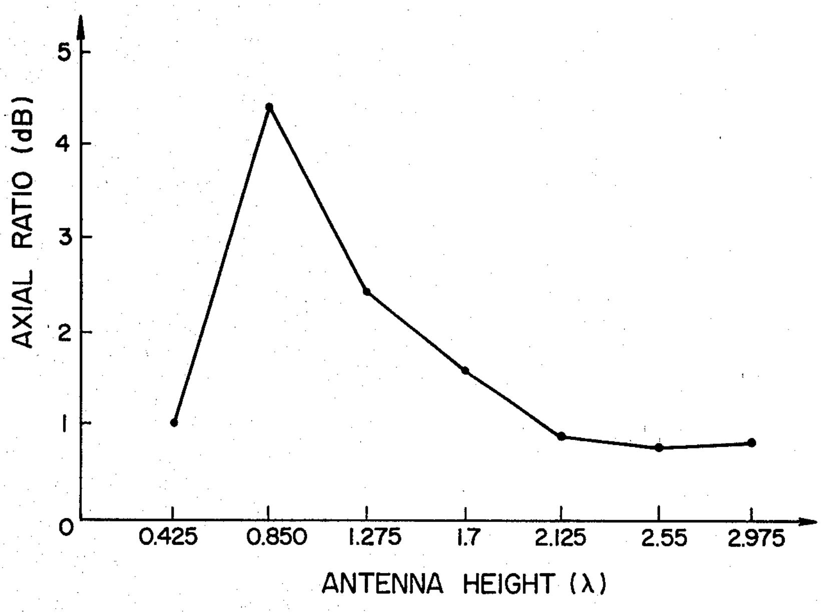
FIG. 2 is a characteristic diagram showing the relationship betwen the axial ratio and the helical antenna height.
Figure 3:
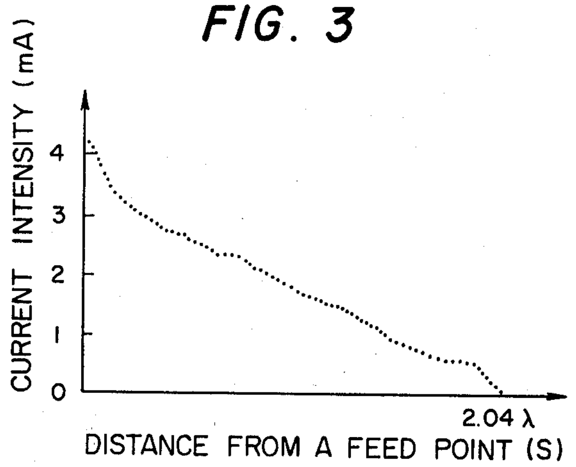
FIG. 3 is a current distribution diagram of the axial-mode helical antenna with a height of approximately 0.5λ, where the abscissa represents distance measured from the feed point along the helix and the ordinate represents current intensity.

FIG. 2 shows the relationship between the antenna height and the axial ratio in the axial-mode helical antenna in which the diameter of the reflector is assumed to be infinite and the pitch angle is set at 12°. As shown in the figure, the axial ratio changes in accordance with the change in the antenna height of the axial-mode helical antenna. The characteristic of axial ratio degrades when the antenna height is around 0.850λ, but it becomes appropriate when the height is around 0.425λ. This is because, as FIGS. 1 and 3 show, when the antenna height is in a range from 0.4λ to 0.6λ the abruptly damping traveling wave, or current ②, is mainly induced while the reflective wave that causes degradation in the axial ratio, or current ④, is scarcely induced. Moreover, when the antenna height is out of the range from 0.4λ to 0.6λ current ④ is induced, thereby resulting in abrupt deterioration in the characteristic of axial ratio.

Figure 4:
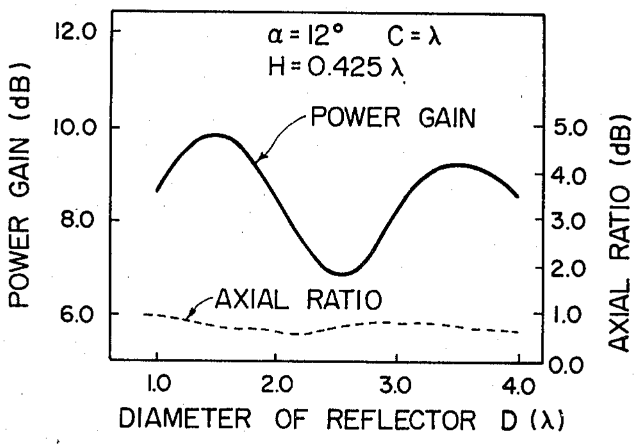
FIG. 4 is a characteristic diagram showing the relationship between the power gain and the diameter of the reflector for the axial-mode helical antenna with a height of approximately 0.5λ and the relationship between the axial ratio and the diameter thereof.

Next, an example of various characteristics of an axial-mode helical antenna with 12° for the antenna pitch angle α, λ for the helical circular length C, and 0.425λ for the antenna height H is shown in FIG. 4 where the abscissa represents the diameter D of the reflector and the ordinates are the calculted value of power gain and that of axial ratio. In addition, the solid and dotted lines in the figure represent power gain and axial ratio, respectively. As is evident from FIG. 4, the characteristic of a single axial-mode helical antenna with 0.425λ for antenna height and approximately λ for diameter of reflector has a power gain of approximately 9 dB and an axial ratio of approximately 1 dB. The same characteristics can be obtained if the antenna height is set within a range from 0.4λ to 0.6λ. Using another type of antenna say, a Yagi antenna, for example, and letting it have the similar characteristic, i.e., a power gain of about 9 dB and an axial ratio of 1 dB, it is necessary to provide as many as 7 to 8 element antennas. This proves that the axial-mode helical antenna with a height of 0.4λ to 0.6λ is higher in gain than another type of antenna having a similar size. Accordingly, it is possible to build a compact array antenna using axial-mode helical antennas of this type as element antennas.

The present invention makes the novel array antenna using the aforementioned low height or short turn axial-mode helical antenna as element antennas thereof smaller in size by narrowing the spacing between element antennas.

Figure 5:
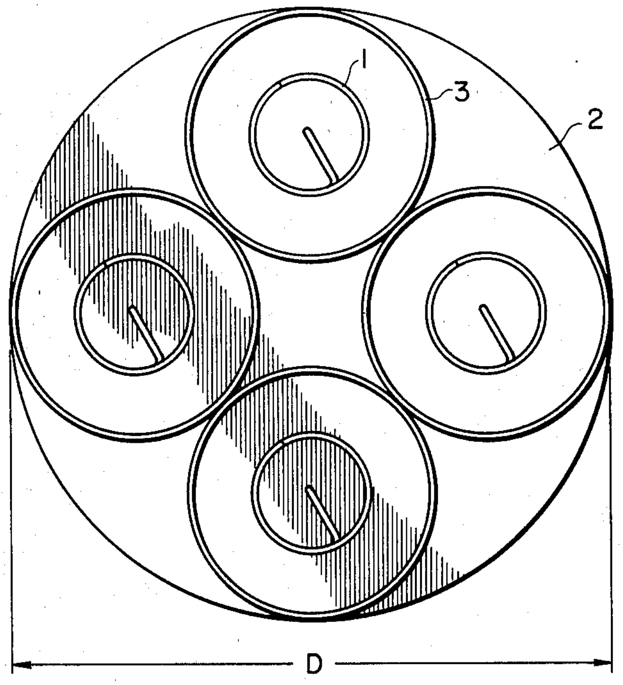
FIG. 5 (*a*) is the front elevation of an embodiment of this invention.
Figure 5:
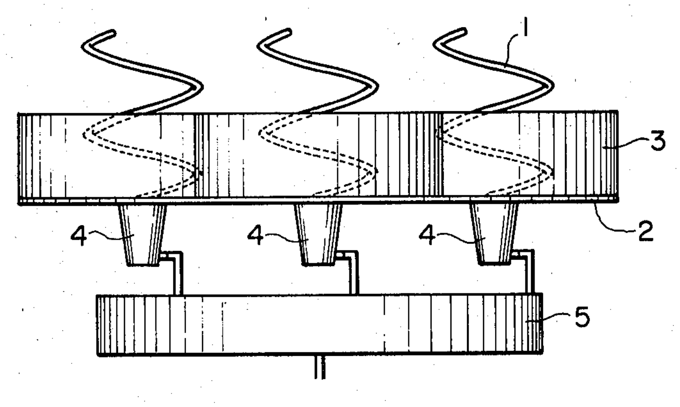

FIG. 5 illustrates one embodiment of this invention. The embodiment is an example of a quad helix array antenna, and FIG. 5 (*a*) is the front elevation thereof and FIG. 5 (*b*) the side elevation thereof.

In FIG. 5, four helical element antennas 1 are disposed at a certain equal interval on a circular reflector 2 having a diameter D. Each of the helical element antennas 1 is surrounded concentrically by a small cylindrical metallic rim 3. Section 4 (FIG. 5*b*) is a matching circuit for the element antennas and section 5 is a combiner.

As is well known, disposing the element antennas closely adjacent to each other to make the array antenna compact induces mutual coupling between the element antennas and influence of the reflector, thereby resulting in an increasing deterioration in antenna characteristics, particularly in axial ratio. However, in the embodiment of this invention, since a small cylindrical metallic rim is disposed concentrically around each helical element as stated above, degradation in antenna characteristics caused by narrowing the spacing between helical elements can be prevented.

Figure 6:
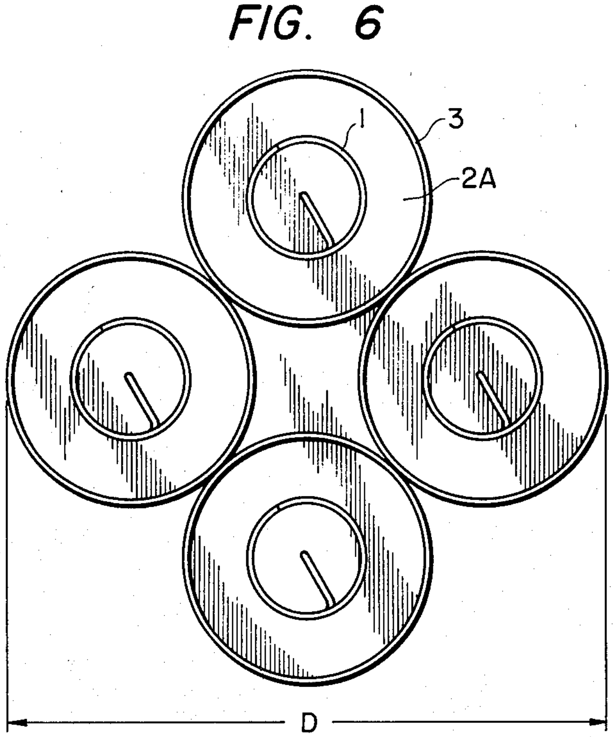
FIG. 6 is the front elevation of another embodiment of this invention.

FIG. 6 shows another embodiment of this invention. In the figure, the parts denoted by the same numerical reference symbols as in FIG. 5 (*a*) are the same or equivalent parts. Four element antennas 1 and four cylindrical metallic rims 3 which coaxially enclose the said element antennas 1 respectively, are placed on a reflector 2A which is formed of the area of said four metallic rims 3 and the area surrounded by the said four rims 3.

In the quad helix array antenna shown in FIG. 6, the diameter of each of said metallic rims may be 0.7λ, the pitch angle of each of said helical element antennas may be 12°, and the circular length and antenna height thereof may be λ and 0.425λ. The four element antennas are disposed at four vertices of a square with a side length of approx. 0.7λ.

Figure 7:
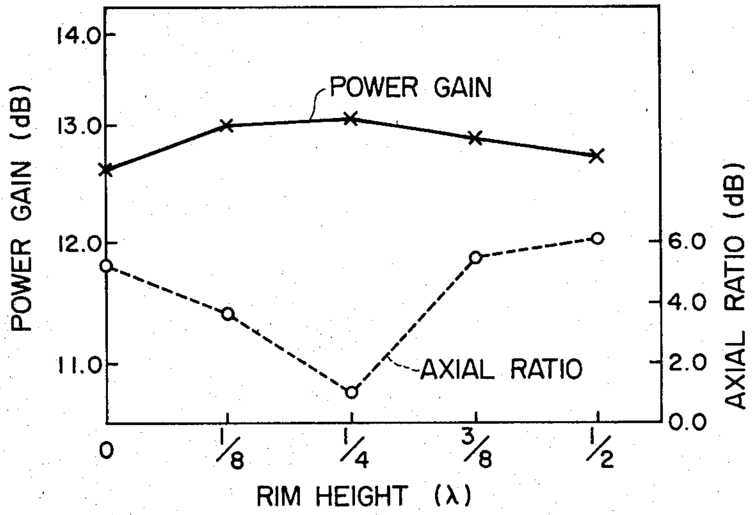
FIG. 7 is a characteristic diagram showing the relationship between the power gain and the height of the rims and the relationship between the axial ratio and the height thereof in the present invention.

FIG. 7 provides measured values of power gain and those of axial ratio vs the rim height of the quad helix array antenna shown in FIG. 6. FIG. 7 proves that the best axial ratio and power gain can be obtained at a rim height 0.25λ, and both power gain and ratio can be improved by approx. 0.4 dB and approx. 4 dB, respectively, compared with those of a rimless quad helical array antenna, thereby enabling the realization of an array antenna having an antenna gain of approx. 13 dB and an axial ratio of approx. 1 dB.

The quad helical array antenna having the aforementioned dimensions has an antenna aperture efficiency of nearly 100% which is one of the parameters indexing the power gain vs the size of antenna. This value is greater than is obtainable in an ordinary parabolic antenna which is approx. 60 to 70%, and well competitive even with the short backfire antenna which is known as a high efficient resonant type antenna, and the antenna aperture efficiency of which is around 80 to 100%.

While a preferred embodiment of the quad helical array antenna has been described hereinbefore, it will be obvious to those skilled in the art that the present invention is not limited to specific use in the quad helical array antenna.

Thus, in the array antenna of the present invention since the axial-mode helical antenna with an antenna height of 0.4λ to 0.6λ which holds a power gain greater than the antennas of other types is used as element antennas and each element antenna is provided with a cylindrical metallic rim, high performance characteristics can be obtained despite the compact dimension. Therefore, the array antenna of the present invention is particularly suitable for mobile communication applications, e.g. 1 as an antenna for maritime satellite communication.

What is claimed is:

1. An array antenna comprising:

a plurality of element antennas disposed closely adjacent to one another, each of said element antennas comprising an axial-mode helical antenna with an antenna height of 0.4λ to 0.6λ (λ: Wave length); and a plurality of cylindrical metallic rims coaxially surrounding the said element antennas, respectively, for suppressing degradation of antenna characteristics caused by mutual coupling between the said element antennas, each of said metallic rims having a height of approximately 0.25λ.

2. An array antenna as claimed in claim 1, wherein the said element antennas are disposed at the four vertices of a square, respectively.

3. An array antenna as claimed in claim 2, wherein the said side length of the square is approximately 0.7λ, and the diameter of each of the said metallic rims is approximately 0.7λ.

* * * * *